United States Patent [19]

Kim

[11] Patent Number: 5,471,664

[45] Date of Patent: Nov. 28, 1995

[54] CLOCKWISE AND COUNTERCLOCKWISE CIRCULARLY POLARIZED WAVE COMMON RECEIVING APPARATUS FOR LOW NOISE CONVERTER

[75] Inventor: Hyo C. Kim, Anyang City, Rep. of Korea

[73] Assignee: Samsung Electro-Mechanics Co., Ltd., Suwon City, Rep. of Korea

[21] Appl. No.: 176,217

[22] Filed: Dec. 30, 1993

[51] Int. Cl.[6] ............................. H04B 1/26; H04H 1/00; H01P 1/16; H01P 1/26
[52] U.S. Cl. ..................... 455/323; 455/3.2; 455/327; 333/21 A; 343/700 MS
[58] Field of Search ..................... 455/3.2, 275, 277.1, 455/277.2, 134, 135, 323, 327; 343/700 MS: 853; 333/21 A, 128, 116, 26

[56] References Cited

U.S. PATENT DOCUMENTS

| | | | |
|---|---|---|---|
| 4,951,010 | 8/1990 | Grim | 333/214 |
| 5,214,527 | 5/1993 | Chang et al. | 359/189 |
| 5,276,410 | 1/1994 | Fukuzawa et al. | 333/21 A |
| 5,303,403 | 4/1994 | Leong | 455/192.3 |
| 5,359,336 | 10/1994 | Yoshida | 343/756 |
| 5,384,557 | 1/1995 | Yoshida et al. | 333/21 A |
| 5,410,322 | 4/1995 | Sonoda | 343/700 M S |

*Primary Examiner*—Reinhard J. Eisenzopf
*Assistant Examiner*—Lee Nguyen
*Attorney, Agent, or Firm*—Webb Ziesenheim Bruening Logsdon Orkin & Hanson

[57] ABSTRACT

The input probe of an LNB for commonly receiving clockwise and counterclockwise circularly polarized waves includes a rectangular microstrip patch, with the length of one edge of it being $\lambda_g/4$, which is installed at the center of an annular strip shaped ground pattern, with a feed horn being disposed at the side opposite to a substrate. Four input probes are installed adjacently to the respective edges of the rectangular microstrip patch. The two pair of the input probes which are installed adjacently to the respective edges of the rectangular microstrip patch are respectively commonly connected to first and second feed lines. With this arrangement, the length of one input probe relative to that of the other one shows a difference of $\lambda_g/4$.

1 Claim, 3 Drawing Sheets

CLOCKWISE AND COUNTERCLOCKWISE CIRCULARLY POLARIZED WAVE COMMON RECEIVING APPARATUS FOR LOW NOISE CONVERTER

FIELD OF THE INVENTION

The present invention relates to a low noise block-down converter (LNB) for receiving satellite broadcasts, and particularly to a clockwise and counterclockwise circularly polarized common receiving apparatus for a low noise converter, which is capable of receiving clockwise and counterclockwise circularly polarized waves with an excellent isolation in the microwave band which is the satellite broadcasting band.

BACKGROUND OF THE INVENTION

The satellite broadcasting signals which use the microwave band includes linearly polarized waves and circularly polarized waves, and the circularly polarized waves include clockwise circularly polarized waves and counterclockwise circularly polarized waves.

Further, a rectangular microstrip patch is used as an effective means for receiving the satellite broadcasts of clockwise and counterclockwise circularly polarized waves. The currently existing circularly polarized wave signal pickup device using the conventional rectangular microstrip patch is illustrated in FIG. 1. As shown in this drawing, input probes 11 and 12 are installed on two edges of a rectangular microstrip patch 10, and the feeding lines of input probes 11 and 12 are connected to hybrid coupler 13, so that clockwise and clockwiseclockwise circularly polarized wave signals should be outputted through output ports 14 and 15 of the hybrid coupler 13.

Output port 14 outputs signals received by input probe 11, and signals received by input probe 12 which is phase-delayed by $\lambda_g/4$, i.e., 90°. Output port 15 outputs signals received by input probe 12 and signals received by input probe 11 which is phase-delayed by $\lambda_g/4$, i.e., 90°. Therefore, outputs ports 14 and 15 give circularly polarized waves (clockwise circularly polarized waves and counterclockwise circularly polarized waves) of mutually opposite phases.

In this conventional clockwise and counterclockwise circularly polarized wave receiving apparatus, the two circularly polarized wave signals are separated by means of only the hybrid coupler 13. Therefore, a part of the signals of output port 14 is leaked to output port 15, and a part of the signals of output port 15 is leaked to output port 14, with the result that the receiving efficiency is lowered. Further, due to the reflections of the signals leaked from the other output port, the isolation characteristics are deteriorated.

SUMMARY OF THE INVENTION

Therefore it is the object of the present invention to provide a clockwise and counterclockwise circularly polarized wave common receiving apparatus for a low noise converter, in which the aggravation of the signal isolation characteristics at the input terminals of the clockwise and counterclockwise circularly polarized wave common receiving apparatus can be improved.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
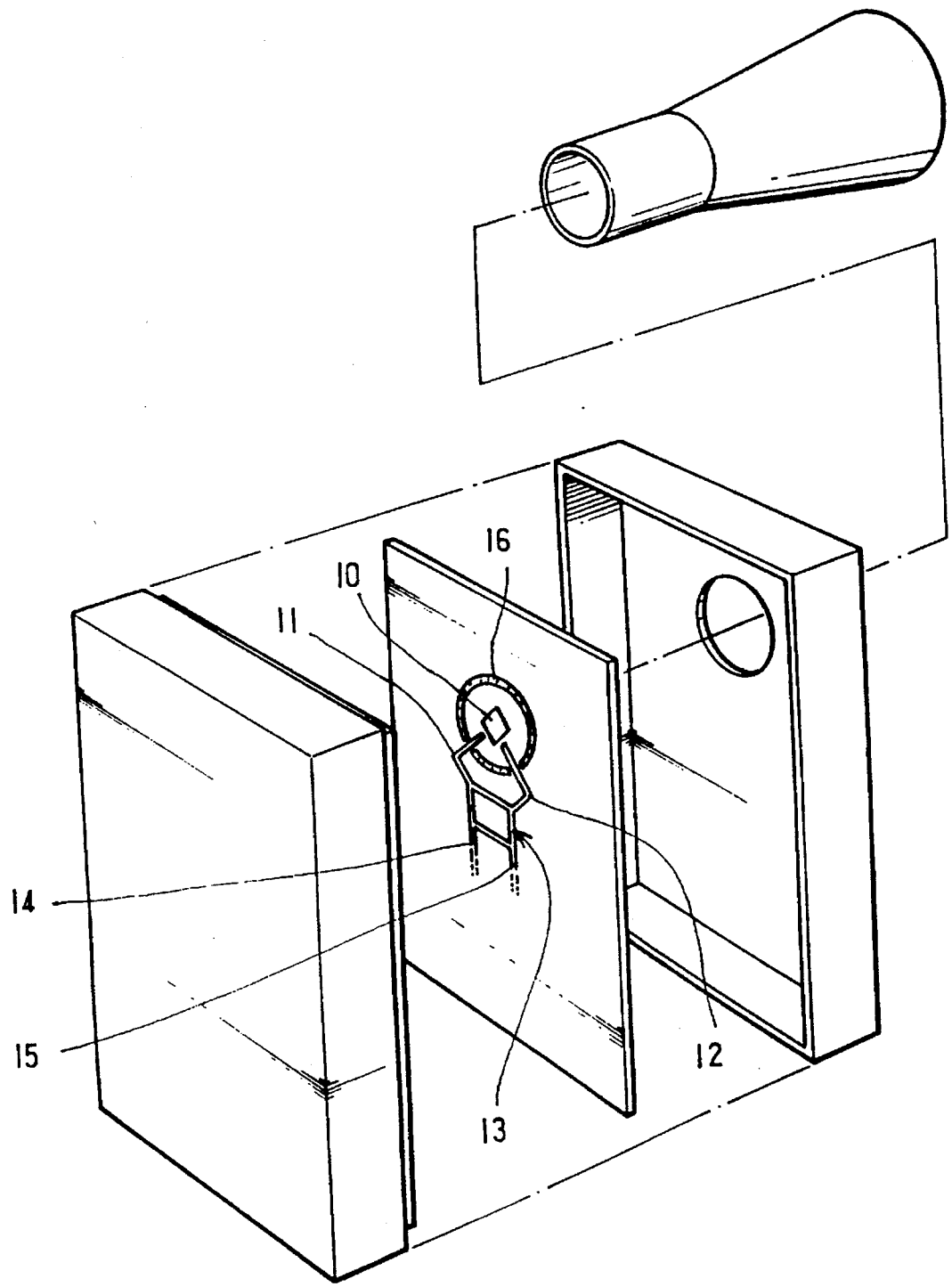
FIG. 1 is a schematic view of a conventional circularly polarized wave common receiving apparatus for a conventional low noise converter.
Figure 2:
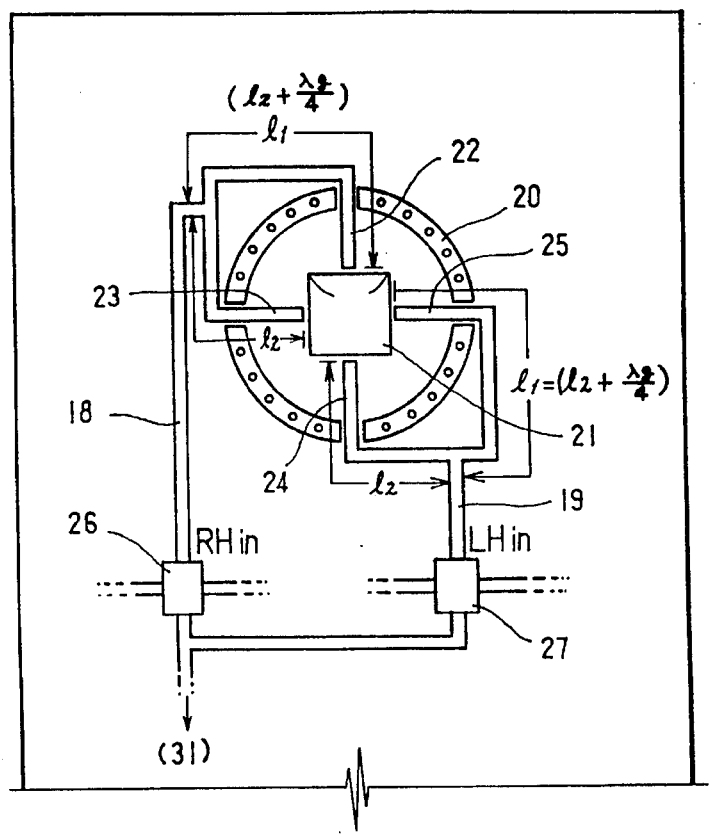
FIG. 2 is an enlarged view of a circularly polarized wave common receiving apparatus according to the present invention.

FIG. 2 illustrates an input probe according to the present invention. Referring to this drawing, reference number 20 indicates an annular strip shaped ground pattern with which a feed horn is to be coupled. The ground pattern 20 is connected through a plurality of through-holes to another ground pattern which is disposed on the back of the substrate.

Within the ground pattern 20, there is provided a rectangular microstrip patch 21, with the length of one edge of microstrip patch 21 being $\lambda_g/4$. Near the respective edges of the microstrip patch 21, there are installed four input probes, i.e., first to fourth input probes 22–25.

The first to fourth input probes 22–25 extend across the respective edges of the microstrip patch 21, and pass across the annular strip shaped ground pattern 20 to be ultimately drawn to the outside. The four input probes 22–25 are grouped into two sets to be respectively connected to the adjacent probes.

Referring to the drawings, the first input probe 22 is connected to the second input probe 23, and the third input probe 24 is connected to the fourth input probe 25.

The pairs of the first and second input probes 22 and 23 and the third and fourth input probes 24 and 25 are connected respectively through first and second common feed lines 18 and 19 to first and second Hemt switching sections 26 and 27.

Under this condition, the connecting position of the first common feed line 18, which is connected to the first and second input probe 22 and 23, is defined to be l1=l2+$\lambda_g/4$, where l1 represents the length of the first input probe 22, and l2 represents the length of the second input probe 23. Therefore, the length l1 of the first input probe 22 is longer than the length l2 of the second input probe as much as $\lambda_g/4$.

Meanwhile, the connecting position of the second common feed line 19, which is connected to the third and fourth input probes 24 and 25, is defined to be the position at which the length of the third input probe 24 is shorter than the length of the fourth input probe 25 as much as $\lambda_g/4$.

That is, the lengths of both the first and fourth probes 22 and 25 are indicated by l1, and the lengths of both the second and third input probes 23 and 24 are indicated by l2. Thus the relation l1=l2+$\lambda_g/4$ becomes valid.

Figure 3:
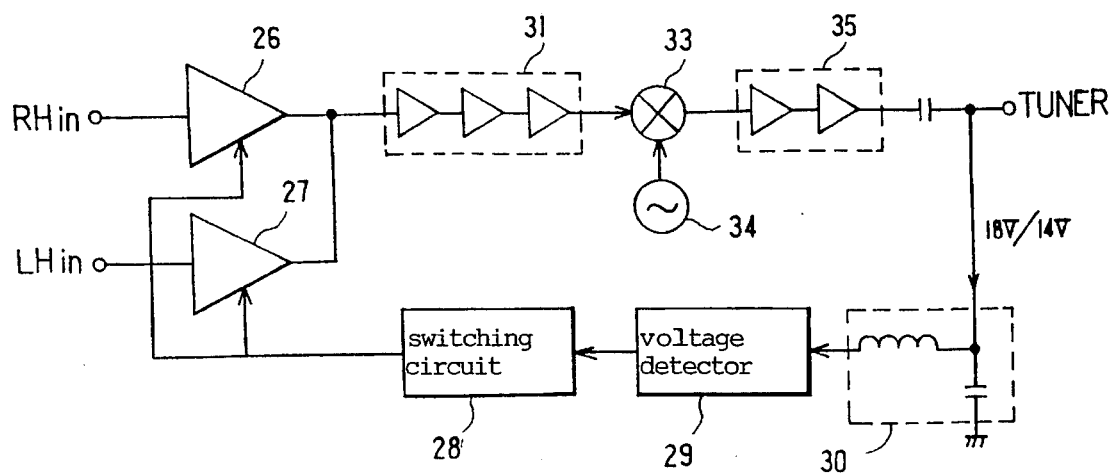
FIG. 3 illustrates the signal processing and power supply circuits for the low noise converter (LNB) according to the present invention.

FIG. 3 illustrates the constitution of the LNB. As shown in this drawing, the outputs of the Hemt switching sections 26 and 27 are supplied through an LNA (low noise amplifier) 31 to a mixer 33. Further, the IF signals which are generated by a local oscillator 34 connected to the mixer 33 are supplied through an IF amplifying section 35 to a satellite tuner (not shown).

Further, an 18/14 V LNB power which is supplied through a cable from an intra-room satellite broadcast tuner is supplied through an ac blocking RF choke section 30 to a voltage level detecting circuit section 29 in which the LNB power is subjected to the detection of the LNB power level. The output of the voltage level detecting circuit section 29 is supplied to a switching circuit section 28 for selectively driving the first and second Hemt switching sections 26 and 27.

Figure 4:
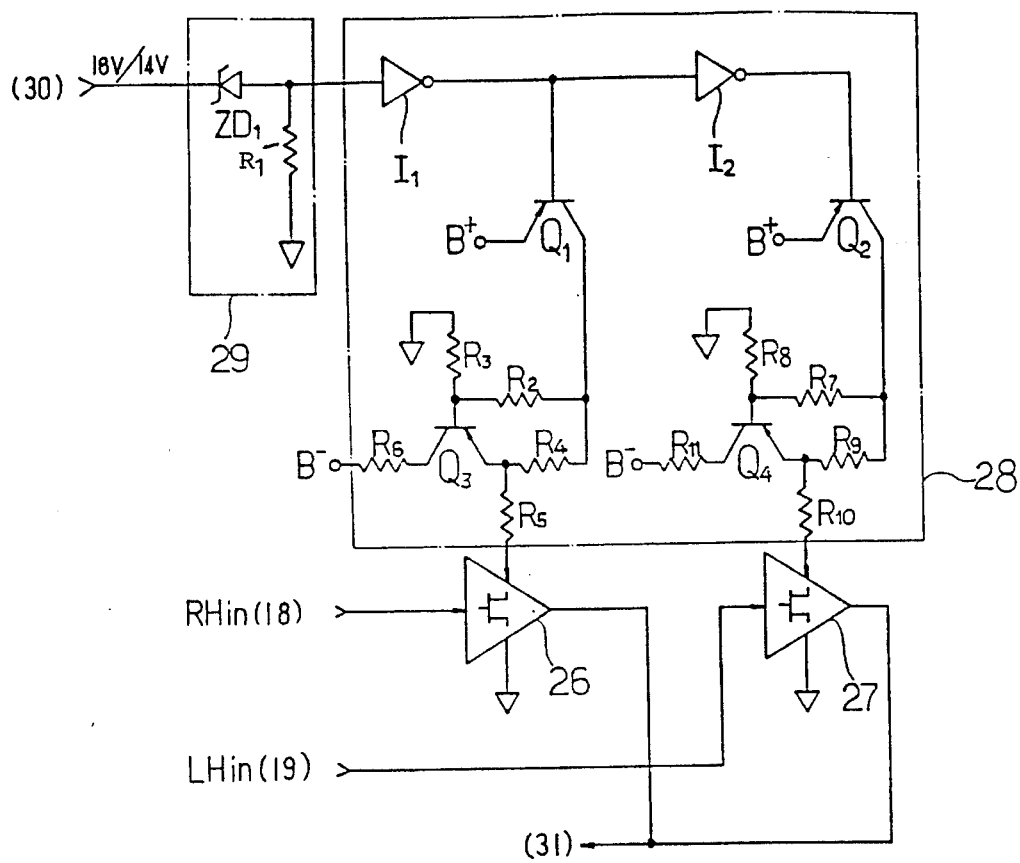
FIG. 4 illustrates in detail the constitution of the switching circuit and the voltage level detecting circuit according to the present invention.

FIG. 4 illustrates an example of the circuital constitution of the voltage level detecting circuit section 29 and the switching circuit section 28 according to the present invention. The voltage level detecting circuit section 29 includes a resistor R1 and a zener diode ZD1 for recognizing the input LNB power voltage (14/18 V). Meanwhile, the switching circuit section 28 is connected in such a manner that the detection output of the voltage level detecting circuit section 29 is supplied through a first invertor I1 to the base of a first switching transistor Q1 on the one hand, and also supplied through the first invertor I2 and a second invertor I1 to the base of a second switching transistor Q2 on the other hand. Further, a $B^+$ voltage which is outputted through the collectors of the first and second switching transistors Q1 and Q2 is respectively supplied through resistor R2, R3, R7 and R8 to the bases of third and fourth switching transistors Q3 and Q4 on the one hand, and also supplied through resistors R4 and R9 to the emitters of the third and fourth switching transistors Q3 and Q4.

Meanwhile, a B voltage is supplied respectively through resistors R6 and R11 to the collectors of the third and fourth switching transistors Q3 and Q4. The outputs of the emitters of the third and fourth switching transistors Q3 and Q4 are supplied respectively through resistors R5 and R10 to the first and second Hemt switching section 26 and 27.

The apparatus of the present invention constituted as above will now be described as to its operation and effects.

Figure 5:
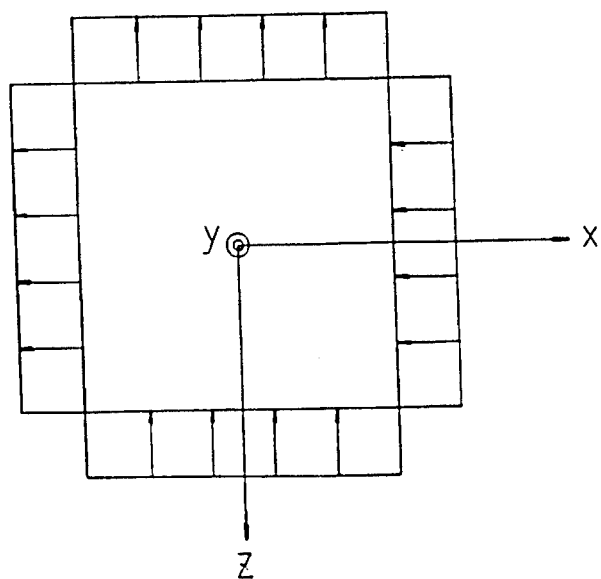
FIG. 5 illustrates the equivalent radiating slot for the rectangular microstrip patch.

The microstrip patch 21 according to the present invention has four radiation slots as shown in FIG. 5.

Two of the slots are positioned on the X axis, and the other two slots are positioned on the Z axis. If the mutual coupling influence of the two sets of the slots is disregarded, the radiation field can be expressed by the voltages at the radiation slots.

In order to calculate the voltages at the respective slots, if the incident voltage at the input terminals of the respective probes is assumed to be $1 < 0°$ [V], then the electric field component can be expressed by the sum addition of voltages at the four slots.

In order to simplify the expression of the electric field formula, if it is limited to the x-y plane, e.g., $\Theta = \pi/2$, then the following relation can be established.

$$Er = 0$$

$$E\Theta = \frac{jWH}{\lambda_o} \frac{e^{-jkor}}{r} \sin \frac{\sin(kW/2 \cdot \cos\Phi)}{(kW/2)\cos\Phi} [E3 + E4]$$

$$E_\Phi =$$

-continued $$\frac{jWH}{\lambda_o} \frac{e^{-jkor}}{r} \frac{\sin(kH/2 \cdot \cos\Phi)}{(kW/2)\cos\Phi} [E1\, e^{jkodcos\phi} + E2\, e^{-jkodcos\phi}]$$

where d represents ½(l+H),

Er, EΘ and Eφ represent the voltages for r, Θ and φ of the spherical coordinate corresponding to the x, y and z of the cartesian cubical coordinate, H represents the thickness of the microstrip substrate, W represents the width of the microstrip line, k represents the propagation constant, and E1 to E4 represent the voltages of the respective slots.

If the electric field is limited to the x-y plane, i.e., $\phi = \pi/2$, then it can be expressed by the following formulas.

$$Er = 0$$

$$E\Theta =$$

$$\frac{jkoWH}{\lambda_o} \frac{e^{-jkor}}{r} \frac{\sin(kH/2 \cdot \cos\Theta)}{(kH/2)\cos\Theta} [E3\, e^{jkodcos\Theta} + E4\, e^{-jkodcos\Theta}]$$

$$E_\Phi = \frac{jkoWH}{2\pi} \frac{e^{-jkor}}{r} \sin\Theta \frac{\sin(kW/2 \cdot \cos\Theta)}{(k\omega/2)\cos\Theta} [E1 + E2]$$

Thus the electric field intensity signals which are obtained at the respective slots of the rectangular microstrip patch 21 are picked up by the first and second input probes 22 and 23 and the third and fourth input probes 24 and 25. These signals are then supplied through the first Hemt switching section 26 and the second Hemt switching section 27 to the LNA 31.

Under this condition, there exists a phase difference of 90° between the waves picked up by the first input probe 22 and the waves picked up by the second input probe 23, and therefore, circularly polarized signals are picked up.

However, if the first feed line 18 is taken as criteria, there exists a difference of $\lambda_g/4$ in the lengths of the first input probe 22 and the second input probe 23. Therefore, actually the same circularly polarized signals, e.g., clockwise circularly polarized signals RHin, appear on the first feed line 18 to be supplied through the first Hemt switching section 26 to the LNA 31.

Under this condition, the second Hemt switching section 27 is in a turned-off state, and therefore the leakage from the third and fourth input probes 24 and 25 for picking up the counterclockwise circularly polarized waves are blocked.

In the same way, for example, if the second Hemt switching section 27 is selected for receiving the counterclockwise circularly polarized waves, when the second feed line 19 is taken as criteria, the third and fourth input probes 24 and 25 which have a length difference of $\lambda_g/4$ (a 90° phase difference) pick up the counterclockwise circularly polarized signals to supply them to the LNA 31.

In order to select the first and second Hemt switching sections 26 and 27, if the LNB power which is outputted from an intra room satellite tuner is supplied through an RF choke section 30 to the voltage level detecting circuit section 29, then the voltage level detecting circuit section 29 outputs a logic level correspondingly with the 14/18 V input.

For example, in the case where the zener diode ZD1 of the voltage level detecting circuit section 29 is set to 13 V, if the LNB power input is 18 V, its output voltage becomes 5 V, while if the LNB power voltage is 14 V, its output becomes 1 V. Here, the internal power consumption of the zener diode ZD1 is disregarded.

Such an output of the voltage level detecting circuit section 29 passes through the first and second invertors I1 and I2 of the switching circuit section 28. If the LNB power is 18 V, the first invertor I1 outputs a low level output, while, if the LNB power is 14 V, the first invertor I1 outputs a high level output. Accordingly, the second invertor I2 outputs logic levels which are opposite to the outputs of the first invertor I1.

Thus if the inputted LNB power is 18 V, the first switching transistor Q1 of the switching circuit section 28 is turned on, while the second switching transistor Q2 is turned off. Meanwhile, the third and fourth switching transistors Q3 and Q4 are respectively turned on and off.

Further, if the inputted LNB power is 14 V, the second and fourth switching transistors Q2 and Q4 of the switching circuit section 28 are turned on, while the first and third switching transistors Q1 and Q3 are turned off.

Thus the first and second Hemt switching sections 26 and 27 are selectively turned on, so that they should be able to receive the clockwise and counterclockwise circularly polarized waves in a selective manner. Such signals are low-noise-amplified by the LNA 31, and are mixed with the oscillation signals of the local oscillator 34 by the mixer 33, thereby generating IF signals.

Such IF signals are transmitted through the multi-stage IF amplifying section 35 to an intra room satellite broadcast tuner.

According to the present invention as described above, an input probe is installed on each edge of the rectangular microstrip patch, and feed lines are connected to the pair of the clockwise and counterclockwise circularly polarized wave receiving probes commonly using two input probes which are installed in the adjacent edges of the patch. Further, one of the input probes is longer than the other input probe as much as $\lambda_g/4$, and the feed line is connected to the point of the difference, so that the isolation characteristics and the receiving efficiency for the clockwise and counterclockwise circularly polarized waves can be improved.

What is claimed is:

1. An apparatus for commonly receiving clockwise and counterclockwise circularly polarized waves for a low noise converter, comprising: first and second Hemt switching sections for receiving clockwise and counterclockwise circularly polarized wave signals of input probes installed adjacently to a rectangular microstrip patch through first and second feed lines, to selectively supply said signals to a low noise amplifier in accordance with the magnitude of the voltage of a low noise block converter; and a mixer for mixing output signals of said low noise amplifier with oscillation signals of a local oscillator to generate IF signals, wherein four input probes are installed adjacently to the edges of said rectangular microstrip patch;

pairs of said four input probes adjacently positioned on said rectangular microstrip patch are commonly connected to said first and second feed lines; and the lengths of one of the probes of said common probes connected to said first and second feed lines shows a difference of $\lambda_g/4$ relative to the other input probe of said common probes which is connected to either of said first or second feed lines.

* * * * *

UNITED STATES PATENT AND TRADEMARK OFFICE
CERTIFICATE OF CORRECTION

PATENT NO.   : 5,471,664
DATED        : November 28, 1995
INVENTOR(S)  : Hyo C. Kim It is certified that error appears in the above-indentified patent and that said Letters Patent is hereby corrected as shown below:

Column 1 Line 42 "outputs" should read --output--.

Column 2 Line 51 "probe" should read --probes--.

Column 3 Line 26 "first invertor I2 and a second invertor I1" should read --first invertor I1 and a second invertor I2--.

Column 3 Line 35 "B voltage" should read --B- voltage--.

Column 3 Line 41 "section" should read --sections--.

Signed and Sealed this

Ninth Day of April, 1996

Attest:

BRUCE LEHMAN

Attesting Officer

Commissioner of Patents and Trademarks